Feb. 26, 1946. B. WELTE 2,395,702
PULL BROACH MACHINE WITH WORK FEEDING TABLE
Filed July 23, 1943 5 Sheets-Sheet 1
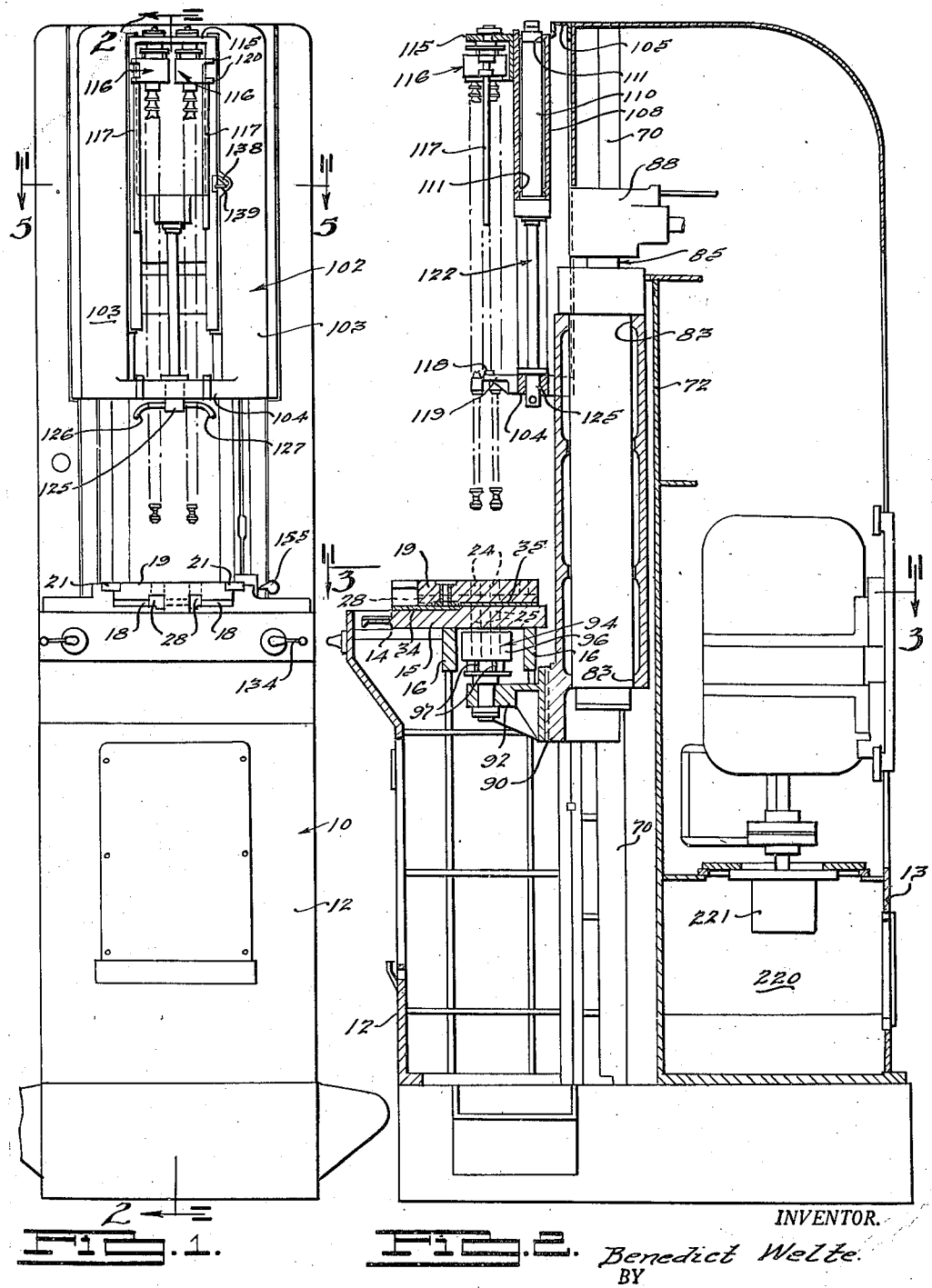
INVENTOR.
Benedict Welte.
BY
Harness, Dickey & Pierce
ATTORNEYS

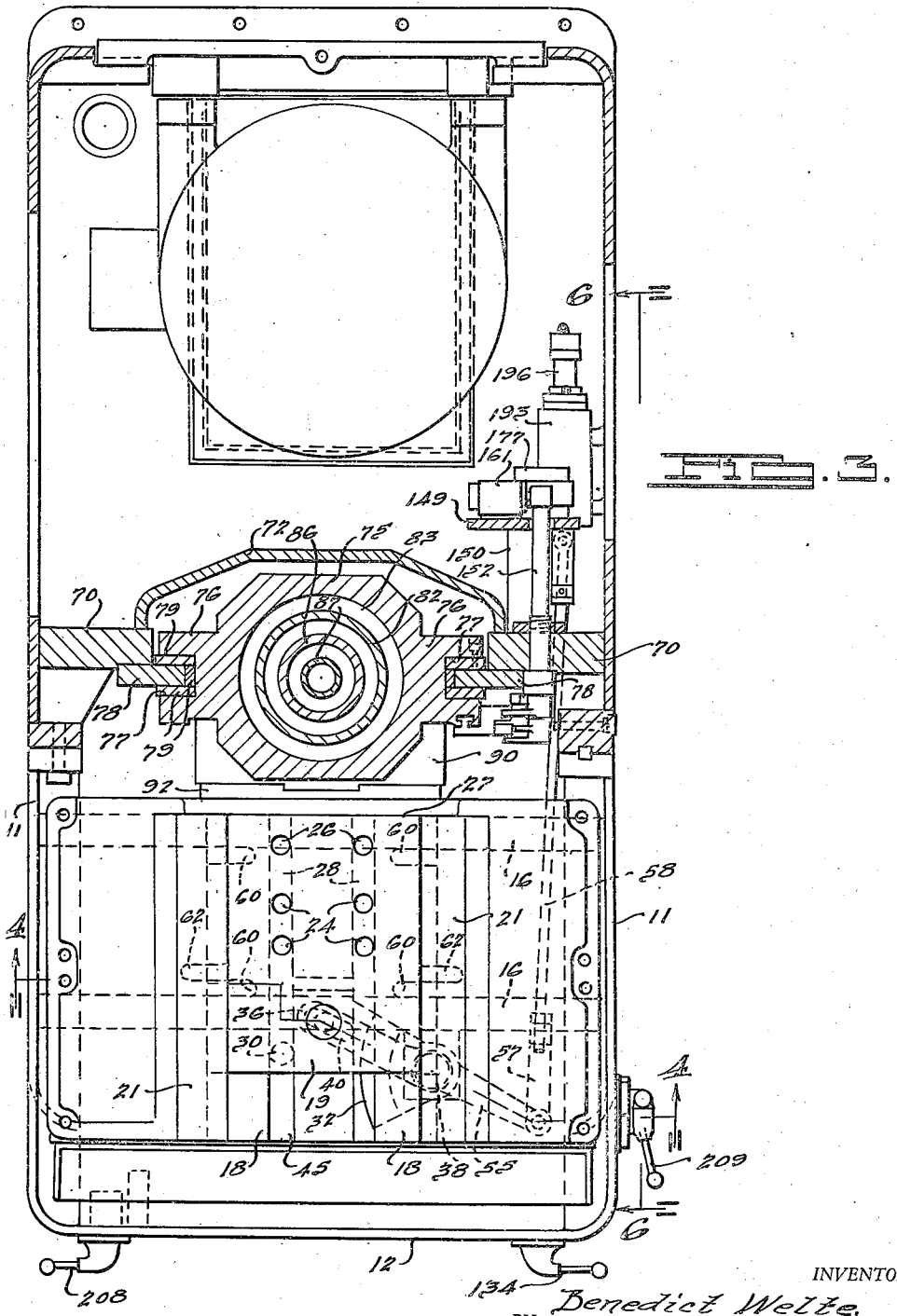

Feb. 26, 1946. B. WELTE 2,395,702
PULL BROACH MACHINE WITH WORK FEEDING TABLE
Filed July 23, 1943 5 Sheets-Sheet 3
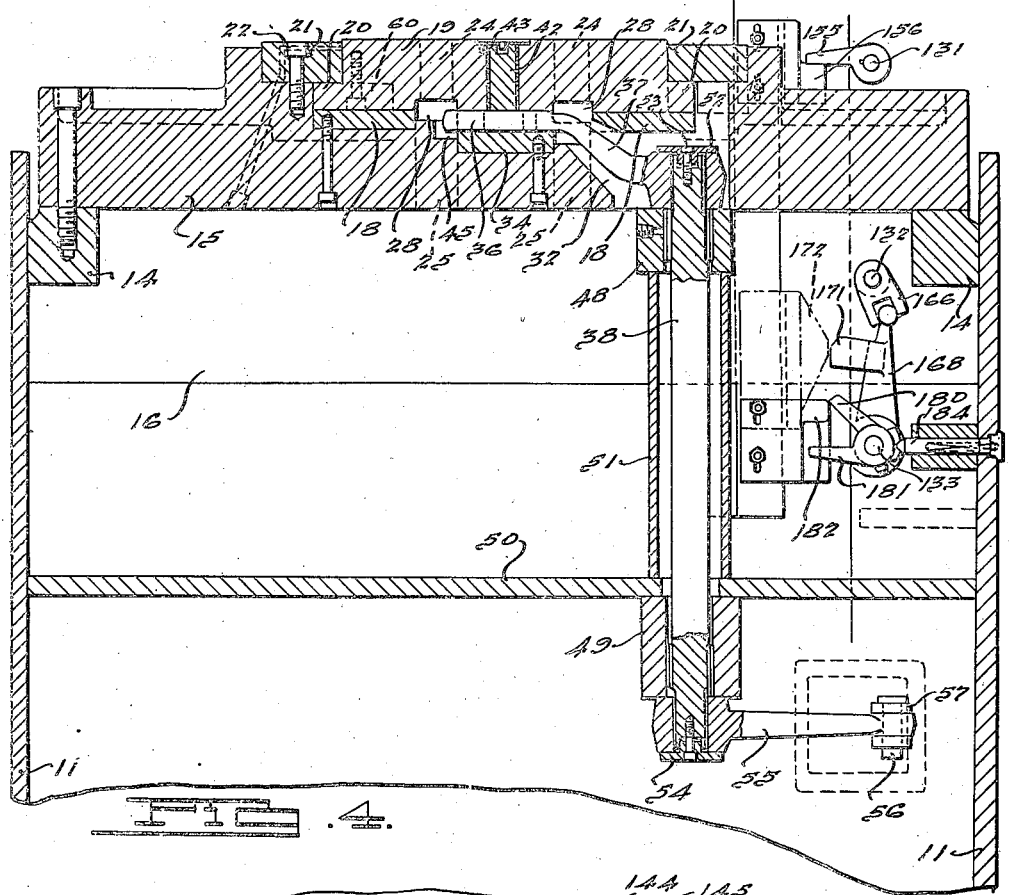
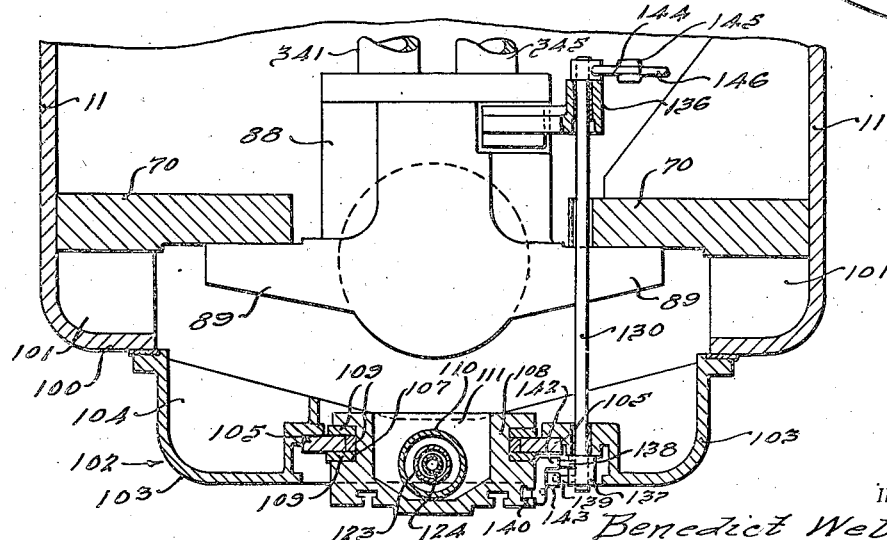
INVENTOR
Benedict Welte.
BY
Harness, Dickey & Pierce
ATTORNEYS.

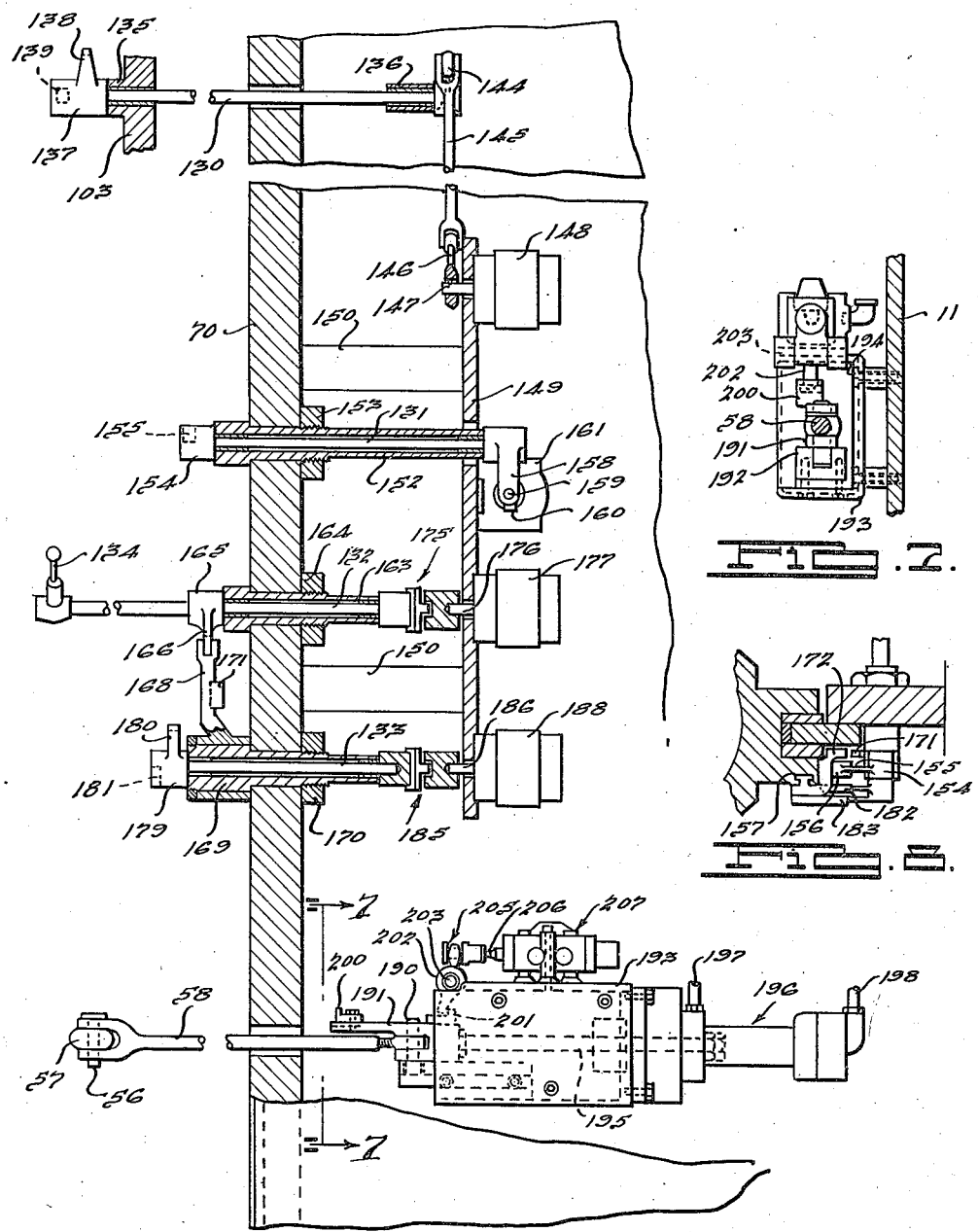

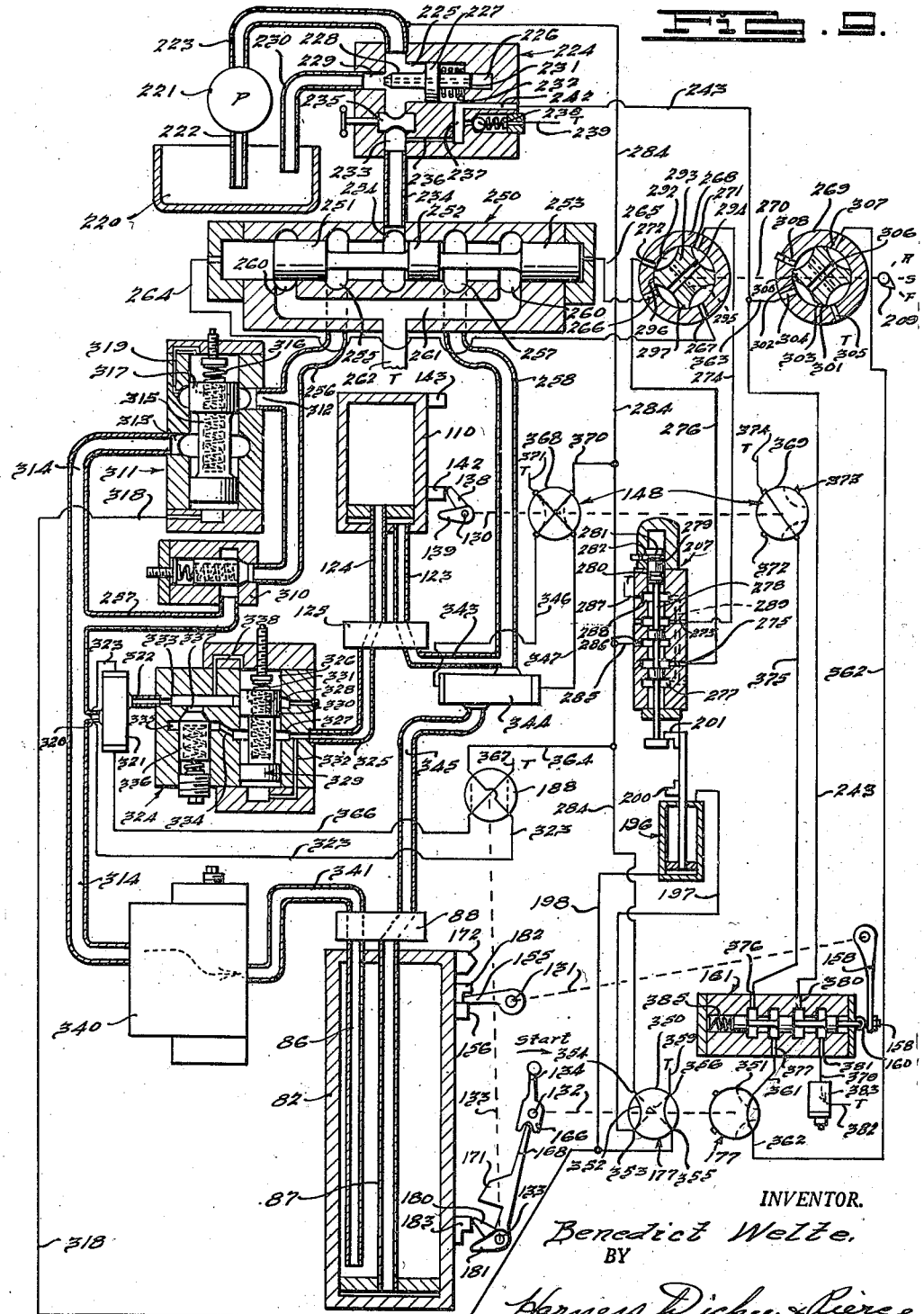

Patented Feb. 26, 1946

2,395,702

UNITED STATES PATENT OFFICE 2,395,702

PULL BROACH MACHINE WITH WORK FEEDING TABLE

Benedict Welte, Lake Orion Township, Oakland County, Mich., assignor to Colonial Broach Company, Detroit, Mich., a corporation of Delaware Application July 23, 1943, Serial No. 495,856

8 Claims. (Cl. 90—33)

The present invention relates to a pull broaching machine adapted to shuttle one or more broaches automatically through a broaching and broach return cycle. The particular embodiment illustrated is a pull down broaching machine adapted to operate four broaches simultaneously.

The time required to load the work in the work fixture of a pull broach machine is lost time since in an ordinary pull broaching machine the completed workpiece is removed and a new workpiece is inserted upon completion of the cycle when the machine is stopped. This lost time constitutes an appreciable portion of the broaching cycle, particularly where the machine is used to operate on a plurality of workpieces simultaneously. Accordingly, it is one object of the present invention to provide a machine of the type mentioned having a moving table for the work fixture which automatically moves out of broaching position upon completion of the broaching stroke, thus enabling the operator to reload the fixture during the broach return portion of the broaching cycle. This arrangement has the further advantage that it eliminates the hazard to which the operator is subject should the machine start while he is loading the work. This hazard is aggravated when the machine pulls a cluster of broaches because there is danger that the operator's hands will be injured by one broach while he is locating the work for another broach.

Another object of the present invention is to provide a moving work supporting table for a pull down broaching machine having a novel means for discharging chips in such a manner that they will not find their way to the ways upon which the table slides or to any of the relatively moving parts of the table moving mechanism.

Another object of the present invention is to provide an improved means for moving the work table of the type mentioned.

Another object of the present invention is to provide an improved hydraulic circuit for automatically operating a hydraulic pull down broaching machine and a moving work table through an automatic broach shuttling cycle.

Another object of the present invention is to provide means for controlling the pressures in the hydraulic system to the end that the pressure source, which is a constant displacement pump, will operate against a reduced pressure during the movements of the work table and the broach handling cylinder.

Another object of the present invention is to provide improved means for preventing the broaching or broach handling cylinders from falling by gravity when the machine is stopped between broaching cycles.

Other objects of the invention will become apparent from the following specification, the drawings relating thereto, and from the claims hereinafter set forth.

In the drawings, in which like numerals are used to designate like parts in the several views throughout:

Figure 1 is a front view of the machine;

Figure 2 is a section taken on the line 2—2 of Figure 1;

Figure 3 is a horizontal section taken on the line 3—3 of Figure 2;

Figure 4 is a vertical section taken on the line 4—4 of Figure 3;

Figure 5 is a horizontal section taken on the line 5—5 of Figure 1;

Figure 6 is a section taken on the line 6—6 of Figure 3 with the casing and other parts of the machine broken away to show the valve operating mechanism;

Figure 7 is a section taken on the line 7—7 of Figure 6;

Figure 8 is a fragmentary sectional view of the trip dogs similar to Figure 3 but taken at a point near the top of the broaching ram; and Figure 9 is a diagrammatic view of the hydraulic circuit of the machine.

Referring to the drawings, the machine comprises a frame or casing 10 made up of a pair of side walls 11, a front wall 12, and a rear wall 13. The side walls 11, as best shown in Figure 4, are provided on their inner sides at their forward portions with a pair of longitudinal rails 14 upon which is supported a stationary work table support 15. A pair of transverse beams 16 extends between the side walls 11 beneath the work table support 15 in order to provide additional support and stiffening for the same.

A pair of hardened steel ways 18 is secured to the support 15 and extends fore and aft in spaced parallel relation in order to provide a sliding support for a movable work table 19. The work table 19 is provided at each side with an outwardly extending flange 20 over which lies a gib 21 which is secured to the support 15 by means of cap screws 22. The gibs serve to hold the moving table in contact with the ways 18 at all times.

As best shown in Figures 3 and 4, the moving table 19 is provided in the region between the ways 18 with four broach openings 24, the particular machine illustrated being adapted to shuttle four broaches simultaneously through the work. The stationary support 15 contains four similar openings 25 which are aligned with the openings 24 when the table 19 is in the broaching position illustrated in Figure 3.

The moving table 19 is also provided with a pair of openings 26 which is aligned with the two forwardly disposed openings 25 in the stationary support 15 when the moving table 19 is in its outer or loading position. At that time the two rearward openings 25 in the stationary support 15 are disposed rearwardly of the rear edge 27 of the moving table 19 and, consequently, the four broaches may be returned while the moving table is in its loading position. It will be noted that the broach openings are located in two rows extending fore and aft of the table.

A pair of chip discharge openings 28 is provided between the moving table 19 and the stationary support 15, as best shown in Figure 4. Each of the chip discharge openings 28 intersects one of the two rows of broach openings 24 and 26. The chip openings are formed by the lower surface of the moving table 19 and the upper surface of the support 15, and are located immediately inside the inner edges of the hardened ways 18. As a result of this arrangement, as the table 19 reciprocates back and forth chips which fall off the broaching tool as it passes through the openings 24 and 26 are discharged forwardly and rearwardly of the table through the openings 28.

The support 15 is provided with an opening 30, shown in dotted lines in Figure 3, which intersects the left-hand chip discharge opening 28 and is disposed forwardly of the front edge of the table 19 when the table is in broaching position. As a result of this arrangement, the chips which work forwardly through the left-hand chip discharge opening 28 will not build up sufficiently to interfere with the movement of the table operating lever, hereinafter referred to, since they will fall through the opening 30.

Chips which work forwardly through the right-hand chip discharge opening 28 are similarly disposed of by means of an opening 32, shown best in Figure 4. The opening 32, which, as hereinafter more fully described, contains the table moving arm, intersects the right-hand chip opening 28 rearwardly of the forward edge of the table 19 when the table is in broaching position and, consequently, discharges the chips before they can accumulate to such an extent that they will interfere with the movement of the table operating lever.

It will be noted that in the region between the chip openings 28 the moving table 19 has a downward projection which contacts the hardened way 34 secured to the support 15. Rearwardly of the way 34, as best shown in Figure 2, the support 15 has an upward projection which carries a hardened way 35 for supporting the rear edge of the table 19. At a point located forwardly of the broach openings 24, there is a gap between the forward end of the way 35 and the rearward portion of the downward projection of table 19 in which is located the extremity 36 of a lever 37 which is splined to the upper end of a vertical shaft 38 and which extends through the opening 32. As best shown in dotted lines in Figure 3, the opening 32 is sector form in order to permit swinging movement of the arm about a vertical axis.

The extremity 36 of the lever 37 is provided with a slot 40, shown best in dotted lines in Figure 3, in which is received the extremity of a pin 42 journaled in the moving table 19, with the result that on swinging movements of the arm 37 the table will be reciprocated. The upper end of the pin 42 is sealed against chips by means of a plate 43. It will be noted that the extremity 36 of the arm 37 fits closely against the underside of the table 19 and the upper surface of the way 34, with the result that no chips can find their way into the slot 40. The extreme-outer end of the lever 37 projects somewhat into the left-hand chip opening 28 and, accordingly, the forward portion of the chip opening 28 is enlarged by a recess 45 formed in the upper surface of the stationary support 15 to provide additional chip clearance.

The vertical shaft 38 is journaled at its upper end in a bearing block 48, which is fixed to the forward face of the forward beam 16, and is journaled at its lower end in a similar bearing block 49, which is secured to the underside of a shelf 50 which extends between the side walls 11 of the frame. A tube 51 surrounds the shaft 38 between the bearing block 48 and the shelf 50 in order to prevent chips from getting into the lower bearing. The hub of lever 37 sits against the upper surface of the bearing block 48 and prevents chips from entering the upper bearing. A retaining plate 52 is secured by means of a cap scew 53 to the upper end of the shaft 38 and serves to hold the lever 37 against displacement from the shaft. A similar retaining plate 54 at the lower end of the shaft 38 secures a lever 55 to the lower end of the shaft. Both of the levers 37 and 55 are splined to the shaft, with the result that they cannot rotate with reference to the shaft.

The outer end of lever 55 is provided with a pin 56 which extends through the arms of a yoke 57 carried in the forward end of a rod 58 which extends backwardly to the rear portion of the machine and, as hereinafter described, is connected to the hydraulic cylinder and piston unit which operates the moving table. It will be observed that as a result of this driving connection the driving mechanism is protected from chips and is located in such a manner that it will not interfere with the movements of the table or the broach.

As best shown in Figures 3 and 4, means are provided for limiting the movements of the table in both directions. This means comprises a pair of hardened lugs 60 secured at each side in suitable recesses in the table 19. The pair of lugs at each side projects outwardly to a point flush with the outer edge of the table flange 20 and the flange 20 is removed in the region between the two lugs. Similar hardened lugs 62 are secured at each side of the table in suitable recesses formed in the support 15, and the inner ends of the lugs 62 project into the spaces between the lugs 60 formed by the removal of the flanges 20.

As a result of this arrangement, the outer ends of the forward pair of lugs 60 abut the inner ends of the lugs 62 when the table 19 is in the broaching position shown in Figure 3. When the table is retracted to loading position, the outer ends of the rearward pair of lugs 60 abut the inner ends of the lugs 62. Thus, there is provided a positive abutment stop for the table in both extreme positions of its movement. The abutments are located on opposite sides of the point of application of the table moving force and, consequently, no cocking of the table can occur.

The machine is provided with a pair of heavy internal vertical columns 70 which project upwardly above the level of the table 19. The outer edges of the columns 70, as best shown in section in Figure 3, are secured to the side walls 11, while the inner edges of the columns 70 are secured together by a rearwardly bowed wall 72, which extends from the bottom of the machine almost to the top thereof. These columns support the broaching ram and the broach handling ram.

In Figure 3 is shown the manner in which the broaching ram is mounted for sliding movement on the columns 70. The ram 75 is of generally cylindrical construction with a pair of laterally projecting vertical ribs 76 having slots 77 formed therein. A pair of hardened ways 78 is fixed to the columns 70 in any suitable manner and projects into the slots 77. Bronze wearing members 79 line the walls of the slots and closely fit the inner edges of the ways 78 in order that the broaching slide or ram may be accurately guided in its vertical movements. The wear members 79 are fixed to the ram and hence slide upon the surface of the ways 78.

The ram 75 is hollow and contains a broach operating cylinder 82 which is centered within the ram by means of internal ribs 83 at the top and bottom of the ram. As best shown in Figures 2 and 3, the broaching cylinder 82 is slidable with respect to a fixed piston rod, indicated generally at 85. The rod is formed of two concentric tubular members, indicated at 86 and 87 in Figure 3. The upper end of the rod is connected to a stationary manifold 88 fixed to the columns 70 by means of a pair of laterally extending ears 89, shown best in Figure 5. The manifold is connected to a pair of pipes for admitting fluid to the cylinder. The arrangement of the manifold, cylinder and double piston rod is conventional and hence need not be illustrated or described in detail. It is sufficient to note that one of the two pipes connected to the manifold 88 communicates with the space within the inner tubular member 87, while the other pipe connected to the manifold communicates with the space between the tubular members 86 and 87. The interior of the inner tubular member 87 is in open communication with the interior of the cylinder 82 below the piston carried by the double rod, while the space between the tubular members 86 and 87 is in open communication with the cylinder at the opposite side of the piston.

The lower portion of the broachng ram has a forward projection 90 upon the front face of which is mounted a bracket 92 which carries a pair of broach pulling chucks indicated generally at 94, one of which chucks appears in Figure 2. The other chuck, which is of identical construction, is immediately behind the chuck 94, as viewed in Figure 2. Each chuck is a double chuck; that is, it contains means for gripping and pulling two broaches. Consequently, the machine is adapted to pull four broaches simultaneously. The construction of the chucks is conventional and hence need not be described in detail. It is sufficient simply to note that when the broaching ram is at the top of its broach return stroke the release sleeve 96, which surrounds each pulling chuck, engages the underside of the support 15 or any other suitable abutment and is forced downwardly against the action of a plurality of spring pressed plungers 97. In that position the chuck is in a broach releasing condition and the broaches may be inserted in or withdrawn from the chuck freely. When the broaching stroke begins the ram moves downwardly, allowing the sleeve 96 to move upwardly relative to the bracket 92, thus locking the broaches within the chuck and enabling the ram to perform the broaching operation.

In Figure 5 is illustrated the mounting of the broach handling slide. As there shown, the upper portion of the frame of the machine has the side walls turned inwardly at 100 with web sections 101 for stiffening, and a generally rectangular channel-shaped framework 102 is secured to the front face of the turned in wall portions 100. The channl-shaped frame member 102 has a pair of vertically extending side portions 103 connected by a lower cross member 104 and an upper cross member 105. A pair of inwardly projecting vertically extending hardened ways 105 is fixedly secured to the inner sides of the vertical sides 103 of frame 102, and these members project into suitable slots 107 formed in the sides of a broach handling slide 108. Wear plates 109 line the slots 107 and engage the hardened ways 105, the wear plates being fixed to the slide 108 and being slidable upon the ways 105.

A broach handling cylinder 110 is secured within the interior of the slide 108 and is centered in position by means of a pair of webs 111 having circular openings which fit the cylinder. A bracket 115 is secured to the front face of the slide 108 in any suitable manner and carries a pair of double chucks 116 similar in construction and mode of operation to the chucks 94 except that they are released at the end of the downward stroke of the slide 108 by reason of the engagement of a pair of rods 117 fixed to the release sleeves of the chucks with a stop pad 118 carried by a bracket 119 mounted on the lower cross frame member 104. The rods 117 are secured to the outer sides of the chucks 116 by threading them into suitable openings in a pair of ears 120 formed on the side of each chuck.

The cylinder 110 mounted in the slide 108 is supplied with fluid through a double piston rod, indicated generally 122 in Figure 2. As best shown in Figure 5, the piston rod 122 comprises an outer tube 123 and an inner tube 124, both of which are fixed at their lower ends to a manifold 125 carried by the cross member 104. The manifold is adapted to be connected to a pair of pipes 126 and 127, one of which communicates with the space within the inner tubular member 124 and the other with the space between the tubular members 123 and 124. As previously described in connection with the main broaching cylinder, the interior of the tubular member 124 communicates with the upper end of the cylinder 110, while the space between the tubular members communicates with the lower end of the cylinder.

The arrangement of the trip dogs for controlling the hydraulic valves, which, in turn, control the automatic cycle of operation of the machine, is best shown in Figures 1, 3, 5, 6, 7 and 8.

Referring to Figure 6, the machine is provided with four valve control rods which are actuated by the broachng ram and the broach handling slide. These rods include the rod 130, which is controlled by the broach handling slide, and the rods 131, 132 and 133, which are controlled by the broaching ram. The rod 132 is also manually controlled in that it is rotated in one direction manually by the starting handle 134. Rod 130 is journaled at one end in a bearing boss 135 formed in the frame 103 and at the other end in a bearing 136 fixed in any suitable manner to the manifold 88, as shown best in Figure 5. The forward end of the rod 130 carries a boss 137 provided with a pair of arms 138 and 139 disposed at an angle to each other and facing toward the adjacent edge of the broach handling slide 108.

As best shown in Figure 5, the broach handling slide 108 is provided with a T-slot 140 in which is secured a pair of trip dogs 142 and 143. The trip dog 142 is located adjacent the lower end of the broach handling slide in alignment with the arm 138, while the trip dog 143 is located adjacent the top of the broach handling slide and is adapted to engage the arm 139 when the slide reaches the lower end of its stroke. When the slide reaches the top of its stroke, the trip dog 142 engages the arm 138 and rotates the rod 130 clockwise, as viewed from the front of the machine. The rod is returned in a counterclockwise direction by engagement of the trip dog 143 with the arm 139 when the slide reaches the lower end of its stroke.

The inner end of the rod 130 is fixed to a lever 144, the outer extremity of which is pivoted to a rod 145 which, in turn, is pivoted at its lower end to the extremity of a lever 146 fixed to the stem 147 of a control valve 148. The valve 148 is a dual valve, as more fully described hereinafter in connection with the hydraulic circuit.

The dual valve 148 is mounted on a valve panel 149, which is fixed to the rear side of columns 70 by means of a pair of supporting members 150.

The rod 131 is journaled in a tube 152, which extends through an opening in the right-hand column 70 and is secured in position by means of a nut 153. The forward end of the rod 131 carries a boss 154 having an arm 155 which projects toward the main broaching slide and is adapted to engage a trip dog 156, which is secured in a T-slot 157 formed in the forward face of the broaching ram, as best shown in Figure 8. The position of the trip dog 156 is such that when the broaching ram is at the top of its stroke, the dog engages the arm 155 and rotates the rod 131 in a clockwise direction. As soon as the broaching ram starts downwardly, the rod 131 is free to rotate in a counterclockwise direction. The inner end of rod 131 carries a lever 158 provided at its extremity with an adjustable set screw 159 adapted to engage a roller 160 on the end of the stem of a valve 161, which is likewise carried on the panel 149. When the trip dog 156 engages the arm 155, the lever 158 forces the stem of valve 161 inwardly. The valve 161 contains a return spring which forces the stem outwardly and rotates the shaft 131 in a counterclockwise direction when the broaching ram leaves its uppermost position.

Rod 132 is journaled in a sleeve 163 which extends through an opening in the column 70 and is secured by means of a nut 164. The outer end of the rod 132, as previously indicated, carries the starting handle 134, and the rod at a point intermediate its ends also carries a boss 165 provided with a downwardly projecting slotted member 166. The slot in the member 166, as best shown in Figure 4, is adapted to receive the upper extremity of a lever 168 which is journaled on a tubular member 169 which likewise projects through the column 70 and is secured by means of a nut 170. The lever 168 carries intermediate its ends a lug or projection 171, which projects toward the broaching ram and is adapted to cooperate with a trip dog 172 secured to the broaching slide by means of the T-slot 157. As best shown in Figure 4, the projection 171 and the trip dog 172 are provided with interengaging cam surfaces so arranged that they will not engage until after the starting handle has been shifted to starting position by rotating it clockwise, as viewed from the front of the machine. The trip dog 172, as shown in dotted lines in Figure 4, is in the position it assumes when the broaching ram is at the bottom of its stroke. The trip dogs 156 and 182, shown in solid lines in Figure 4, are in the positions they assume when the broaching ram is at the top of its stroke. Upon shifting of the starting lever the lever 168, with its projection 171, is shifted toward the broaching ram and the projection 171 is then in position to be engaged by the trip dog 172. The trip dog 172 is located adjacent the top of the broaching ram in a position to engage the projection 171 when the broaching ram reaches the end of its broaching stroke, at which time the trip dog will be effective to rotate the lever 168 clockwise and thus return the rod 132 and starting handle 134 in a counterclockwise direction to the stop position.

The inner end of rod 132 is connected by a cross T coupling 175 to the stem 176 of a dual valve 177.

The rod 133 is journaled within the tubular member 169 and carries at its outer end a boss 179 having a pair of arms 180 and 181. The broaching ram is provided with a trip dog 182 adapted to engage the arm 180 when the broaching ram reaches the top of its stroke and thus rotate rod 133 in a clockwise direction. The ram is also provided with a trip dog 183 adapted to engage the arm 181 when the broaching ram completes its downward or broaching stroke and thus return the rod 133 in a counterclockwise direction to its initial position. The boss 179 is provided with a pair of notches, one of which is adapted to receive a spring pressed plunger 184 in each of the rotative positions of the boss. The inner end of the rod 133 is connected by a cross T coupling 185 to the stem 186 of a control valve 188, more fully described hereinafter.

As best shown in Figure 6, the rod 58, which operates the moving work fixture, extends rearwardly through an opening in the column 70 and is pivoted by a pin 190 to a slide 191 mounted in a channel-shaped guideway 192 carried by a box-shaped bracket 193 which, in turn, is secured to the side wall 11 by means of cap screws 194. The slide 191 is fixed to a piston rod 195 of a piston and cylinder unit indicated generally at 196. The cylinder of the piston and cylinder unit is fixed to the bracket 193 and is, consequently, stationary. A pair of pipes 197 and 198 is connected to the opposite ends of the cylinder.

The upper end of the slide 191 is provided with a pair of trip dogs 200 and 201. When the piston rod 195 is at its forward or left-hand position, as viewed in Figure 6, the trip dog 201 engages the lower end of a lever 202 which is pivoted intermediate its ends on the bracket 193 by means of a pin 203. When the rod is at its rearward or right-hand position, as viewed in Figure 6, the trip dog 200 engages the lever 202 and rotates the lever in its opposite direction. The upper end of the lever 202 is slotted to embrace the spindle of a spool 205 fixed to the end of the stem 206 of a valve 207. The valve 207 is fixedly secured to the top of the bracket 193. As the result of this arrangement, the valve 207 is shifted at each extremity of the stroke of the work fixture or table.

As shown in Figure 3, the machine is provided with an additional control handle 208, similar to the handle 134 but positioned at the left-hand side of the front face of the machine. The handle 208 operates a lock which normally prevents operation of the handle 134. It thus constitutes a well-known form of safety device since the starting handle cannot be shifted unless both hands of the operator are occupied. The machine also carries a handle 209 which operates a reversing and an emergency stop valve, hereinafter referred to.

The hydraulic circuit by which the machine is controlled is illustrated diagrammatically in Figure 9. In order to simplify the illustration, the concentric stationary piston rods 86 and 87 for the broaching cylinder 82 are illustrated as two separate pipes and the rods 130, 131, 132 and 133 for operating the control valves are shown as dotted lines extending in the plane of the paper from an end view of the rods. A number of the smaller fluid lines are also shown as single lines. The drawing is further simplified by omitting most of the lines which run from the various valves to the tank or low pressure reservoir. These lines are indicated by the letter T at their termination.

As shown in Figure 9, the hydraulic system includes a tank or low pressure liquid reservoir 220 and a fixed displacement pump 221 having its inlet pipe 222 extending into the tank and its discharge pipe 223 extending to a speed and pressure control valve mechanism indicated generally at 224. The valve 224 has an internal cylindrical chamber 225 having a reduced end portion 226. The cylindrical chamber 225 contains a piston 227 which fits the cylinder and carries at one side a valve plunger 228 which controls a port 229 leading, by means of pipe 230, to the tank. The opposite side of the piston carries a plunger 231 which fits the reduced bore 226 and a spring 232 normally acts upon the piston 227 to shift it in a direction to close port 229. The valve plunger 228 and the plunger 231 are of the same diameter, and the entire piston and plunger assembly is provided with a longitudinal opening from one end to the other, as best shown in dotted lines in Figure 9.

The chamber 225 is in constant communication with the pump discharge line 223 and also with a passageway 233 which connects with an outlet pipe 234. The passageway 233 contains an adjustable throttle valve 235. The valve 235 is so constructed that it will not entirely close the passageway 223 but may be adjusted to provide a variable restriction to the flow of liquid in the passageway. The passageway 233 at a point beyond the throttle valve 235 is in constant communication with the right-hand end of the cylinder chamber 225 by means of a small bleed passageway 236 and a communicating passageway 237. The passageway 237, in turn, communicates through a ball check valve 238 to the tank line 239.

The structure of the speed and pressure control valve so far described forms no part of the present invention, since it is conventional. The operation of the valve is as follows.

Fluid from the pump, which may flow unrestricted through the line 223 and chamber 225 to the passageway 233, is subject to a restriction at the throttle valve 235 which causes a drop in pressure between that existing in the chamber 225 and that existing at the discharge end of passageway 233. Consequently, the pressure at the discharge end of the passageway, which is communicated through passageway 236 and 237 to the right-hand end of the cylindrical chamber 225 and acts on the right-hand side of the piston 227, is lower than the pressure acting on the left-hand side of the piston 227. As a result, the difference in fluid pressure tends to force the piston to the right and open the port 229 to the tank, and this tendency is resisted by the spring 232. The spring 232 is relatively light and is constructed to permit opening of port 229 on a relatively small difference in pressure at the opposite sides of the piston, such as a difference in pressure in the order of eighteen pounds per square inch.

As a result of this arrangement, the piston 227 will shift to the right, thus opening port 229 at any time the pressure drop across the throttle valve 235 tends to exceed the pressure difference for which the spring 232 is set. This opening of port 229 by-passes a part of the constant flow of liquid from the pump to the tank and, consequently, reduces the flow across the throttle valve 235 and thereby reduces the pressure drop across the throttle valve until the pressure drop falls to or below that for which the spring 232 is set. Accordingly, the structure so far described functions to maintain automatically a flow through passageway 233 of sufficient fluid to cause a given pressure drop determined by spring 232 across the throttle valve, regardless of the pressure existing in the passageway 233. Since the only way in which the pressure drop across the valve 235 can be maintained uniform is by maintaining the quantity of liquid which flows past the valve uniform, the function of the valve mechanism so far described is to maintain a uniform rate of flow from passageway 233 to pipe 234, regardless of the resistance against which the pressure is flowing. The valve 235 is adjusted to pass the quantity of liquid necessary to operate the broaching ram at the desired cutting speed; consequently, the ram will move at that speed, even though the resistance to its movement is variable.

It will be noted that in addition to operating as a speed control valve the valve 224 also performs the important function of insuring that the pressure against which the pump is discharging during the broaching and broach return strokes of the ram never exceeds the pressure required to move the broaching ram at the desired speed plus the small constant pressure drop across the throttle valve 235. This follows from the fact that the pressure in the pump discharge line 223 is always equal to the pressure in line 234 plus the drop in pressure across the throttle valve 235, and the pressure in chamber 225 is automatically maintained at a sufficient level to pass the desired quantity of liquid through the valve 235 regardless of the resistance to ram movement. This is an important feature inasmuch as during a considerable portion of the cycle little resistance is offered to the movement of the broaching cylinder, and it is undesirable to have the pump operating at a high pressure during those periods since it would waste power and, moreover, that power would show up in the form of heat in the liquid.

The check valve 238 is a safety release device, and the spring which normally holds the check valve closed is set to open at the maximum allowable pressure, which may be in the order of a thousand pounds per square inch. If at any time the resistance is sufficiently great to build up a pressure in pipe 234 and passageway 233 sufficient to open the check valve 238, the fluid in passageway 237 will immediately flow to tank through line 239 and at a faster rate than it can be supplied through the small bleed passageway 236. As a result, the pressure in passageway 237 and, therefore, the pressure at the right-hand side of piston 227 will drop, allowing the pressure at the right-hand side of piston 227 to shift the piston to the right and open port 229, thus relieving the pressure on the system.

It will be understood that since the broach handling cylinder and the work table moving cylinder are much smaller than the broaching ram cylinder, they will require a smaller flow of liquid. Since valve 235 is set for the flow required to operate the ram cylinder, the valve 224 will not operate automatically as a speed or pressure control valve during the movements of the handling cylinder and table cylinder.

However, means are provided for limiting the pressure developed by the pump during movements of the broach handling cylinder and the table cylinder. This means includes a port 242 in valve 224, which connects passageway 237 and a pressure control line 243 and means hereinafter described for controlling the pressure in line 243.

The fluid from line 234 is conducted to a four-way valve, indicated generally at 250, which is provided with a spool having three lands 251, 252 and 253, respectively. The valve housing is provided with a port 254 connected to the line 234, a port 255 connected to a discharge line 256, a port 257 connected to a discharge line 258, and a pair of ports 260 at the ends of the housing which is connected by a passageway 261 to tank line 262. The valve is a pilot operated valve, being provided with a pair of pilot lines 264 and 265 leading to opposite ends of the valve. On admission of pressure to pilot line 264 and connection of line 265 to the tank, the valve spool is shifted to the right into the position shown in the drawings, while it is shifted in the reverse direction if pilot pressure is applied to line 265 and line 264 is connected to the tank.

Pilot lines 264 and 265 are connected to ports 266 and 267 of a rotary four-way valve 268. The rotary valve 268 comprises one portion of a dual reversing valve, the other portion being indicated at 269. The two valves are connected by a shaft 270, indicated in dotted lines, to the reverse control handle 209, which may be mounted in any convenient location on the machine. The reversing valves 268 and 269 are illustrated in their forward or normal position, at which time port 266 communicates with port 271 and port 267 communicates with port 272. Port 271 is connected to port 273 of the four-way valve 207 by means of a line 274, and port 272 of valve 268 is connected to a port 275 of valve 207 by means of a line 276.

As previously indicated, the valve 207 is a four-way valve controlled by trip dogs 200 and 201 connected to the piston of a movable work fixture, piston and cylinder unit 196. The spool and ports of valve 207 are generally similar to those of valve 250 except that the spool 278 is provided with an enlarged end portion 279 having a pair of spaced notches 280 and 281 adapted to co-operate with a spring-pressed detent 282, which acts to hold the spool against accidental displacement from either of its two positions of adjustment. When the spool is in the position shown in the drawings which it occupies when the piston is at the lower end of cylinder and piston unit 196 and the work fixture is in its loading position, pressure is transmitted from line 284, which is connected to the pump discharge pipe 223 through line 285 to port 286, which is in communication with port 275. At the same time the tank line 287, which is connected to port 288, is in communication with port 273 and line 274. Pilot pressure is thus transmitted through valve 207 to line 276 and thence through valve 268 from port 272 to port 267 to pilot line 264 to the left-hand end of the main four-way control valve 250. At the same time, the right-hand pilot line 265 of valve 250 is connected to the tank through ports 266 and 271 of valve 268, line 274, port 273 and port 288 of valve 207, and line 287. This serves to hold the spool 252 of valve 250 in the right-hand position shown in Figure 9.

When the work table is shifted to its broaching position, the spool 278 of valve 207 is shifted to its upper position, thus reversing the connections to lines 274 and 276. At that time the pilot pressure flows from port 286 to port 273, through line 274, from port 271 to port 266 of valve 268, and thence to the pilot line 265 at the right-hand end of valve 250. At the same time, the pilot line 264 at the left-hand end is connected with the tank through valve 268, line 276, and by communicating ports 275 and 277, passageway 289, and port 288 of valve 207.

As a result of this arrangement, it is apparent that the main four-way valve 250 is reversed at each end of the stroke of the work fixture cylinder and piston unit 196. If at any time during the cycle of operation it is desired to reverse the machine, the dual valve 268 and 269 is shifted to its reverse position. This reverses the connections between lines 264 and 265, on one hand, and lines 274 and 276, on the other, and thus reverses the position of spool 252 of valve 250 with respect to the position of spool 278 of valve 207. In the reverse position of the valve 268 port 272 is in fluid communication with port 266 through the space 292 in the valve stem formed in the rotatable plug 293 of valve 268, and port 267 is in communication with port 271 through the opening 294 in the valve plug. In the position shown in Figure 9, the communication between ports 267 and 272 is through the opening 295 in the valve plug, shown in dotted lines. When the reversing handle 209 is shifted to the stop position, indicated by S in Figure 9, the lands 296 and 297 block ports 266 and 267, with the result that no fluid can flow through the valve 268.

The valve 269, which forms part of the dual reversing valve, is identical in construction to valve 268 except that the lands 300 and 301 on the valve plug have cut-away corners at 302 and 303, with the result that when the valve is in its central or stop position fluid may flow from port 304 and port 305 through the passageway 306 in the valve plug to port 307. When valve 269 is in the forward position, shown in the drawings, port 305 is blocked because of the fact that port 308 is plugged, while port 304 is connected to port 307 through passageway 306. When the valve is shifted to reverse position, ports 305 and 307 are connected through passageway 306 and port 304 is blocked.

All of the parts in Figure 9 are in the position they assume when the machine is automatically stopped at the end of a broaching cycle and is in condition to be started on a new cycle of operation of the starting handle 134.

In the stop position illustrated, the valves are in such a position that fluid from pipe 234 may flow through valve 250 from port 254 to port 255 and thence to pipe 256. Pipe 256 is connected to a check valve 310, which is so arranged as to permit relatively free flow from pipe 256 to a pipe 257, but no return flow. Pipe 256 is also connected to a valve 311. Valve 311 is provided with a pair of ports 312 and 313. Port 312 is connected to pipe 256, while port 313 is connected to pipe 314 which, in turn, is joined by previously mentioned pipe 257. The spool 315 of valve 311 is normally urged by spring 316 into the position shown in the drawings, in which the land 317 of the spool blocks communication between ports 312 and 313. However, when pilot pressure is applied to the pilot line 318, which is connected to the lower end of the valve, the spool will be lifted, permitting communication between the ports 312 and 313. During the upward movement of the valve spool the fluid trapped above the land 317 is discharged through a small passageway 319 to the port 312. From pipe 314 the fluid may flow through a short branch line 320 to a pilot operated valve 321, which, in turn, is connected to a pipe 322. Valve 321 operates to block the flow of fluid from pipe 320 to pipe 322 except when pilot pressure is applied to the pilot line 323 leading to the upper end of the valve.

Valve 321 may be of any desired construction; for example, it may be identical in construction to valve 250 except that the ports corresponding to ports 255 and 260 are blocked and the pipes 320 and 322 are connected to the ports which correspond to the ports 254 and 257 of valve 250.

Pipe 322 connects to a foot valve 324, which functions to permit relatively free flow from line 322 to line 325 but offers sufficient resistance to return flow from line 325 to 322 to prevent the fluid trapped in the upper end of the cylinder 110 from discharging through the piston rod 124 and pipe 325 under the influence of gravity acting on the cylinder and broach handling slide. The interior of valve 324 contains a cylindrical housing 326 provided with a pair of ports 327 and 328 and a spool 329 provided with a land 330 which, when the spool is held in its lower position illustrated by spring 331, blocks communication between ports 327 and 328. Port 327 is connected by means of a passageway 332 to the space at the lower end of the valve spool 329. Consequently, when the pressure in line 325, which is connected to port 327, reaches an amount sufficient to overcome the influence of spring 331, spool 329 will lift, allowing flow from port 327 to port 328 and thence through passageway 333 to line 322. The tension of spring 331 is adjusted so that it will not open until the pressure in pipe 325 exceeds the pressure which is induced by the force of gravity acting upon the broach handling slide. Port 327 is also connected by passageway 334 to a channel 335 of a spring-pressed check valve 336 which normally blocks a port 337 connected to passageway 333. The check valve 336 will permit relatively free flow from line 322 through passageways 333 and 337 to channel 335 and through passageway 334 to port 327 and thence to pipe 325. When spool 329 is moved upwardly, the fluid trapped at the upper end is discharged to passageway 333 through passageway 338.

Pipe 314 is also in communication with the upper end of the broaching cylinder 82 through a foot valve 340, which is identical in construction to foot valve 324, and through pipe 341, which is connected to the space between the two piston rods 86 and 87 represented by the pipe 86 in Figure 9.

Port 257 of valve 250 is in constant communication with the lower end of the broach handling cylinder 110 through pipe 258, branch pipe 343, and pipe 123. Pipe 258 may also be connected through valve 344 and pipe 345 to the lower end of the broaching cylinder 82 through piston rod 87. Valve 344 is identical in construction and mode of operation to valve 321, previously described, being controlled by pilot pressure in pilot lines 346 and 347.

The fluid for operating the work fixture cylinder and piston 196 is supplied through line 284 to valve 350, which forms one of the valves of the dual valve unit 177, the other valve being indicated at 351. Valve 350 is identical in construction and mode of operation to valve 268, previously described, and hence need not be described in detail, while valve 351 is of the same construction except that two of the ports are plugged.

In the drawings, the flow through valves 350 and 351 is indicated diagrammatically. Thus, in valve 350 the solid line 352 connecting ports 353 and 354 indicates that in the position of the valve illustrated in the drawings ports 353 and 354 are in fluid communication with each other. At the same time, as similarly indicated, ports 355 and 356 are in communication. As a result of this, line 284 is connected through valve 350 to line 197, which leads to the upper end of the work fixture cylinder and piston unit 196, while the line 198, which is connected to the lower end of the cylinder and piston unit 196, is connected through ports 355 and 356 of valve 350 to tank line 359. When valve 350 is shifted by clockwise rotation of the starting handle 134 to start the machine, port 353 is connected to port 356 and port 354 is connected to port 355, as indicated by the dotted lines in Figure 9, thus supplying fluid pressure to the lower end of the piston and cylinder unit 196 and connecting the upper end to the tank. This immediately starts movement of the work fixture from its loading to its broaching position. The pilot line 318 of valve 311 is connected to line 198 and hence pilot pressure is applied to valve 311 when the starting valve is shifted to starting position.

When the machine is in the stop position illustrated, valve 351 connects a line 361 with a line 362, which, in turn, is connected to port 307 of valve 269 and thence through passageway 306 to port 304, from which it is connected by a short line 363 to the pressure control line 243. Consequently, when the valve 351 is shifted to its starting position, flow of fluid under pressure in line 362 is blocked, as indicated by the dotted lines on valve 351 in Figure 9. The dual valve 177 is returned to starting position, as previously indicated, at the end of the downward stroke of the broaching cylinder 82 by reason of the engagement of the trip dog 172 with the projection 171 on lever 168.

The pilot pressure for controlling valve 321 is controlled by valve 188, which is also identical in construction to the valve 268, previously described. When the parts are in the stop position illustrated, the pressure line 284 is connected by a branch line 364 through valve 188 to the pilot line 323 leading to the upper end of valve 321, while the pilot line 366 to the lower end of valve 321 is connected through valve 188 to the tank line 367, and, consequently, valve 321 is open.

Valve 188 is carried by rod 133, which, in turn, is rotated by the arms 180 and 181 and trip dogs 182 and 183 as previously described. When the broaching ram reaches the bottom of its downward stroke, trip dog 182 engages arm 181 and rotates shaft 133 and thus valve 188 to a position in which the pressure line 284 is connected to pilot line 366, as indicated in dotted lines on valve 188, and the tank line 367 is connected to pilot line 323, thus shifting the spool of valve 321 and blocking communication between pipes 320 and 322. When the broaching cylinder 82 reaches its uppermost position on its broach return stroke, trip dog 183 engages and rotates arm 180, thus returning valve 188 to the position shown in Figure 9.

The pilot lines 346 and 347, which control valve 344, are controlled by valve 368, which is one of the valves of the dual valve 148, previously mentioned, the other valve of the dual valve being indicated 369. Valve 368 is identical in construction to valve 268 and, in the position illustrated in the drawings, connects pilot line 346 through line 370 to the pressure line 284 and at the same time connects pilot line 347 to the tank line 371. Under these circumstances, valve 344 is closed. When the broach handling cylinder 110 reaches the end of its downward stroke, trip dog 143 engages arm 139, thus rotating valve 148 counter-clockwise until pilot line 347 is connected to line 370 and thence to the pressure line 284, while pilot line 346 is connected to the tank line 371, as indicated in dotted lines on valve 368. This shifts valve 344 and opens communication between pipes 258 and 345.

When the broach handling cylinder 110 returns to its top position, trip dog 142 engages arm 138 and returns dual valve 148 to the position shown in the drawings. The other valve 369 of dual valve 148 is also identical in construction to valve 268 except that ports 372 and 373 are plugged. In the stop position illustrated, valve 369 connects the tank line 374 to a line 375 which leads to port 376 of valve 161. When the dual valve 148 is shifted at the bottom of the downward stroke of the broach handling cylinder 110, communication between the tank line 374 and line 375 is blocked by valve 369.

Valve 161, in the position shown in the drawings, provides a communication between port 376 and port 377, the latter being connected to the aforementioned line 361. It also provides communication between the pressure control line 243 and a line 379, this connection being from port 380 to port 381. Line 379 is connected to tank line 382 through a pressure relief valve 383, which is identical in construction to the check valve 310 except that the spring which normally holds the check valve closed will not permit the valve to open until the pressure in line 379 exceeds a predetermined pressure necessary to operate both the broach handling cylinder 110 and the work fixture cylinder and piston 196. The purpose of this valve is to prevent the pressure in pressure control line 243, and, consequently, the pressure discharged by the speed control valve 224 to line 234, from exceeding a predetermined pressure during the movements of the broach handling cylinder 110 and the work table cylinder and piston unit 196 in view of the fact that these elements are not subject to the automatic speed and pressure control operation of valve 224. The pressure setting of valve 383, and, consequently, the pressure delivered to pipe 234 during the movements of the broach handling cylinder 110 and the work table is substantially less than the pressure required to operate the broaching cylinder 82.

When the machine is stopped, it will be noted that the pressure control line 243 is connected through line 363, ports 304 and 307 of valve 269, line 362, valve 351, line 361 through ports 377 and 376 of valve 161, line 375, and valve 369 to the tank through tank line 374. Consequently, in the stop position there is no pressure in line 243 and, therefore, valve plunger 228 will be fully opened and the pump will discharge through line 230 to the tank at a very low pressure.

When the machine is shifted to starting position, valve 351 is shifted to disconnect line 362 from the tank. This enables the pressure to build up in line 243 and, consequently, during the operation of the work fixture the pressure supplied by the pump will be limited only by the setting of valve 383.

If at any time while the machine is stopped the broaching cylinder 82 sinks down by gravity, spring 385 in valve 161 will shift the spool of valve 161 to the right and thus block all flow through valve 161. This not only disconnects the line 362 and, therefore, line 361 from line 375, which is connected to tank when the machine is stopped, but it also disconnects line 243 from the pressure relief valve 383, thus enabling the pressure to build up in line 243. As soon as the pressure builds up in line 243, the valve 224 will close and raise the pressure supplied to the upper end of the broach cylinder 82, thereby returning it to its upper position. This insures that the broaching cylinder will not sink downwardly by gravity while the machine is in its stop position and the pump is operating. It also insures that the cylinder will be returned to starting position as soon as the pump is started after an idle period.

The machine operates in the following manner. With the parts in the stop position shown in the drawings and the pump running, passageway 237 in the speed and pressure control valve 224 will be connected directly to tank by lines 243, 363, line 269, line 362, valve 351, line 361, valve 161, line 375, valve 369, and tank line 374. Consequently, the pressure in chamber 225 at the left-hand side of the piston 227 will not exceed the low pressure required to collapse spring 232, and all of the oil discharged by the pump will flow through port 229 to the tank through line 230 except the very small amount which will flow through the bleed passageway 236.

It will be noted that if while the machine is in the stop position illustrated the broaching cylinder 82 sinks down by gravity, trip dog 156 will leave arm 155 and allow the spring 385 of valve 161 to shift the valve spool to a position in which it blocks all flow through the valve. This immediately disconnects line 243 from the tank and allows the speed and pressure control valve 224 to build up a high pressure in the discharge pipe 234. Since, as previously indicated, in the stop position fluid under pressure in pipe 234 is in communication with upper ends of the broach handling cylinder 110 and the broaching cylinder 82, the broaching cylinder will be returned to the top of its stroke. This arrangement, therefore, constitutes an automatic means for prefilling the broaching cylinder so that it will be at the top of its stroke when the machine starts. At the same time, this arrangement will automatically insure that the broach handling cylinder remains at the top of its stroke. Incidentally, it may be noted that the foot valves 324 and 340 normally serve to prevent either of the cylinders 110 and 82 from falling by gravity when the machine is in its stop position. Consequently, the prefill arrangement need only take care of sinking movements due to unavoidable leakage.

It being assumed that the workpieces are secured to the moving work table 19 by any suitable work holding fixture, not shown, the machine is started by rotating lever 134 in a clockwise direction. This rotates the dual valve 177 from the position in which the flow conditions are illustrated in solid lines in Figure 9 to the position in which the flow conditions are illustrated in dotted lines. One of the valves of the dual valve 177, namely valve 351, is thus shifted to a position to block flow through the previously mentioned path from line 243 to the tank. This follows from the fact that line 362 is then no longer connected to line 361. When this occurs, the pressure in line 243 then becomes subject to the control of the pressure relief valve 383, being connected by means of valve 161 to line 379 and thence through the pressure relief valve 383 to the tank line 382. The setting of the pressure relief valve 383 is such that the discharge to the tank will occur at a pressure in excess of that required to operate the work handling cylinder and piston 196 and sufficient to operate the broach handling cylinder 110.

Fluid will then flow from line 284 through the other valve 350 of the dual valve 177 in the dotted line path to line 198, which is connected to the lower end of the work handling piston and cylinder unit 196, thus causing the piston to move upwardly, as viewed in Figure 9, and shift the work table into broaching position. During this movement the liquid in the upper end of the cylinder and piston unit 196 returns to tank through line 197, valve 350 and line 359.

When the broaching fixture reaches broaching position, trip dog 200 on slide 191 shifts the spool 278 of valve 207, thus reversing the pilot connections to valve 250, in the manner previously described. When the spool of valve 250 thus shifts to the left, fluid under pressure in line 234 is transmitted to pipe 258 and flows unrestricted through line 343 and outer piston rod 123 to the lower end of the broach handling cylinder 110, causing it to move downwardly. At the same time, the fluid in the upper end of the cylinder returns to tank through the inner piston rod 124, pipe 325, foot valve 324, which then opens to permit flow from port 327 to port or channel 328, and thence through valve 321, pipes 320 and 314, valve 311, pipe 256, and line 262. At this time the pilot line 318 of valve 311 is connected to line 198 which, in turn, is connected to pressure through valve 350 and line 284, and, consequently, valve 311 is open to permit the above described return flow.

During the downward movement of the work handling cylinder 110, valve 344 blocks flow from line 258 to line 345 by reason of the fact that pilot pressure is connected to the left-hand pilot line 346 by means of valve 368.

During the broach delivering or downward stroke of the broach handling cylinder 110, line 243 limits the pressure delivered by valve 224 by reason of the connection of line 243 to tank through valve 161 and the pressure relief valve 383. During this movement of the broach handling cylinder, therefore, valve 224 does not act as a speed control valve but simply as a pressure relief valve, due to the fact that the flow required to operate the broach handling cylinder is not sufficient on passing throttle valve 235 to cause a pressure drop sufficient to overcome the effect of spring 232. However, the pressure in valve chamber 225 cannot exceed the pressure determined by the setting of relief valve 383 plus the pressure required to overcome the spring 232 and, consequently, valve plunger 228 opens to a degree sufficient to maintain the desired pressure in the chamber 225 and line 234.

When the broach handling cylinder 110 reaches the lower end of its stroke, trip dog 143 engages arm 139 and shifts the dual valve 148. One portion of the dual valve, namely valve 369, is thus shifted into a position in which communication from line 375 to the tank line 374 is blocked. This insures that the pressure control line 243 and the branch thereof which includes line 363, valve 269, line 362, valve 351, line 361, valve 161 and line 375 will not be connected to tank when the valve 351 is subsequently returned to the position shown in the drawings. The other valve 368 of the dual valve 148 on such shift reverses the pilot connections to valve 344 and thus permits the fluid under pressure in pipe 258 to flow to pipe 345 and thence to the lower end of the broaching cylinder 82 in order to start the downward or broaching stroke of that cylinder. As soon as the broaching cylinder leaves its upper position, valve 161 is shifted into blocking position, disconnecting line 243 from the pressure relief valve 383 and tank line 382. This immediately eliminates control of valve 224 by the pressure relief valve 383 and enables the valve 224 to act as an automatic speed control and pressure relief valve during the remainder of the broaching or downward stroke of cylinder 82. During the broaching stroke, the return flow from the upper end of the cylinder 82 occurs through the outer piston rod 86, pipe 341, foot valve 340, pipe 314 and the open valve 311 to pipe 256 and thence through valve 250 to the tank line 262.

When the broaching cylinder reaches the end of its broaching stroke, the trip dog 182 engages arm 181 and thus shifts valve 188 to the position in which the flow is indicated in dotted lines in Figure 9. In this position pilot pressure is applied to the lower pilot line 366 of valve 321 and the valve spool assumes the position in which it blocks flow between pipes 320 and 322. At the same time, trip dog 172 engages the cam projection 171 on lever 168, thus returning the starting handle 134 in a counterclockwise direction to its stop position and, therefore, returning the dual valve 177 to the position shown in Figure 9.

The return of valve 350, forming part of the dual valve 177, to the position shown in the drawings returns the valve to the solid line flow conditions illustrated in which the pilot line 318 from the valve 311 is connected to the tank line 359 and, consequently, the valve 311 blocks the return of fluid from the upper end of the cylinder 82 and positively stops the broaching stroke at the point determined by the setting of the trip dog 182. This makes it possible to adjust the broaching stroke to suit the needs of any particular job. It will be understood, of course, that any adjustment of the position of trip dog 182 will be accompanied by corresponding adjustment of trip dog 172 since both must operate at the same time.

When the valve 350, which forms part of the dual valve 177, is thus returned to the position shown in the drawings, the fluid connections to the piston and cylinder unit 196 for the work fixture are reversed and fluid under pressure from line 284 flows through valve 350 to line 197 to the upper end of the cylinder, causing the piston to move downwardly as viewed in Figure 9 and retract the work from broaching position. During the return movement of the table the only pressure control effective is the high pressure relief action of valve 224 made possible by ball check valve 238.

When the piston of cylinder and piston unit 196 returns to the position shown in Figure 9, it shifts the spool 278 of valve 207 into the position shown in the drawings in which it connects pilot pressure through valve 268 to the left-hand pilot line 264 of valve 250, thus initiating the broach return stroke of the broaching cylinder 82 by reason of the fact that fluid under pressure in line 234 then flows through valve 250 to line 256 through check valve 310, line 257, line 314, foot valve 340, pipe 341 and the outer piston rod 86 to the upper end of the broaching cylinder 82. The fluid in the lower end of the cylinder 82 returns to the tank through the inner piston rod 87, pipe 345, valve 344, pipe 258 and valve 250 to the tank line 262.

When the broaching cylinder reaches its uppermost position shown in the drawings, trip dog 183 engages and shifts arm 180 to the position shown, thus rotating valve 188 until it assumes the position in which the flow is indicated by solid lines in Figure 9. In that position, pilot pressure is applied to the upper end of valve 321 by pilot line 323, thus causing the valve 321 to open and permit flow from pipe 320 to pipe 322 and thus through the foot valve 324 past the check valve 336 therein to line 325 and thence to the inner piston rod 124 of the work handling cylinder 110. This starts the broach return stroke of the work handling cylinder 110.

At the same time valve 188 is shifted, trip dog 156 returns arm 155 to the position shown in Figure 9, thus rotating shaft 131 in a clockwise direction and returning the spool of valve 161 to the position shown in which it permits free flow from port 376 to port 377 and from port 380 to port 381. As a result of the shift of valve 161, the pressure in line 243 during the broach return movement of the broach handling cylinder 110 is controlled by a pressure relief valve 383, in the manner previously described.

When the broach handling cylinder 110 reaches the upper end of its broach return stroke, trip dog 142 engages and shifts arm 138 and thus dual valve 148 to the position shown in the drawings in which line 375 is connected to tank through valve 369. This brings the machine to a stop because the next operation in the cycle must be the work advancing stroke of the table and that can only be initiated by manual shift of the starting handle 134. When the machine thus stops, line 375 is connected through valve 161, line 361, valve 351, line 362, valve 269, line 363 to the pressure control line 243, thus causing the valve 224 to discharge to tank at negligible pressure. The shift of valve 368, which forms part of the dual valve 148, restores the pilot lines to valve 344 to the condition in which that valve blocks fluid flow from line 258 to line 345 and thus completes the return of all parts to the stop position illustrated.

The stop and reverse valve is a dual valve comprising two valves 268 and 269. The valve 268 serves, when the reversing handle 209 is shifted from the forward position indicated F to the reverse position indicated R in the drawings, to simply reverse the pilot connections to the main control valve 250 and, consequently, reverse the direction of operation of the broaching and broach handling cylinders with respect to the direction they normally operate for a given position of the work table. The valve 269 performs no function when the dual valve 268—269 is shifted to reverse position, but it is employed to stop the machine when the handle 209 is shifted to the intermediate stop position indicated S. In that position the pressure control line 243 is connected through line 363 to the tank port 305 and, consequently, the valve 224 discharges to tank at low pressure. In the intermediate stop position, all ports of valve 268 are blocked and no function is performed by that valve.

Although only one form of the invention is shown and described herein, it will be appreciated that various modifications and alterations may be made in the machine without departing from the spirit of the invention or the scope of the appended claims.

What is claimed is:

1. In a pull down broaching machine, a vertically operable broach handling cylinder and piston unit, a vertically operable broach pulling cylinder and piston unit, a source of liquid under pressure and hydraulic control means for automatically operating said cylinder and piston units in succession through a broaching cycle and bringing them to a stop in their upper starting positions, said control means including valves and conduits for maintaining one end of each cylinder in fluid communication with said source when the cylinder and piston units are in their starting positions, said one end of each cylinder being the end the admission of liquid to which effects upward movement thereof, a by-pass valve for discharging the fluid from said source at low pressure, means to open said by-pass valve when both of said cylinder and piston units are in their starting position and the machine is stopped in order to reduce the pressure developed at said source, said last named means including means to reduce the opening of said by-pass valve and thereby increase the pressure communicated from said source to said cylinder and piston units in the event the movable element of one of said units sinks by gravity below its starting position prior to the start of the broaching cycle.

2. In a pull down broaching machine, a vertically operable broach handling cylinder and piston unit, a vertically operable broach pulling cylinder and piston unit, a source of liquid under pressure and hydraulic control means for automatically operating said cylinder and piston units in succession through a broaching cycle and bringing them to a stop in their upper starting positions, said control means including valves and conduits for maintaining one end of each cylinder in fluid communication with said source when the cylinder and piston units are in their starting positions, said one end of each cylinder being the end the admission of liquid to which effects upward movement thereof, and foot valves for exerting sufficient resistance to the return of fluid from said ends of said cylinders to counteract the force of gravity, a by-pass valve for discharging the fluid from said source at low pressure, means to open said by-pass valve when both of said cylinder and piston units are in their starting position and the machine is stopped in order to reduce the pressure developed at said source, said last named means including means to reduce the opening of said by-pass valve and thereby increase the pressure communicated from said source to said cylinder and piston units in the event the movable element of said broach pulling unit sinks by gravity below its starting position prior to the start of the broaching cycle.

3. In a pulldown broaching machine, a vertically movable broach handling cylinder and piston unit, a vertically movable broach pulling cylinder and piston unit, a constant displacement pump, hydraulic control means connecting the pump with said cylinders and motor and adapted to operate the same automatically through a broaching cycle including the successive steps of a broach delivery stroke of said broach handling cylinder and piston unit, a broach pulling stroke of said broach pulling cylinder and piston unit, a broach return stroke of the broaching cylinder and piston unit and a broach return stroke of the broach handling cylinder and piston unit and then bring the machine to a stop, said control means including a by-pass valve for controlling the pressure developed by said pump and valves and conduits for maintaining a connection between the pump and the upper ends of both cylinders when the machine is stopped, means for causing said by-pass valve to reduce the pressure developed by said pump to a minimum value when the machine is stopped, means for causing said by-pass valve to increase the pressure developed by the pump in the event the broaching cylinder sinks downwardly by gravity prior to the institution of the broaching cycle, and means for causing said by-pass valve to limit the pressure developed by the pump to an intermediate value during movements of the broach handling cylinder and piston unit.

4. In a pull down broaching machine, a vertically movable broach handling cylinder and piston unit, a vertically movable broach pulling cylinder and piston unit, a work moving fluid motor, a constant displacement pump, hydraulic control means connecting the pump with said cylinders and motor and adapted to operate the same automatically through a broaching cycle including the successive steps of a work advancing stroke of said motor, a broach delivery stroke of said broach handling cylinder and piston unit, a broach pulling stroke of said broach pulling cylinder and piston unit, a work retracting stroke of said motor, a broach return stroke of the broaching cylinder and piston unit and a broach return stroke of the broach handling cylinder and piston unit and then bring the machine to a stop, said control means including a by-pass valve for controlling the pressure developed by said pump and valves and conduits for maintaining a connection between the pump and the upper ends of both cylinders when the machine is stopped, means for causing said by-pass valve to reduce the pressure developed by said pump to a minimum value when the machine is stopped, means for causing said by-pass valve to increase the pressure developed by the pump in the event the broaching cylinder sinks downwardly by gravity prior to the institution of the broaching cycle, and means for causing said by-pass valve to limit the pressure developed by the pump to an intermediate value during movements of the broach handling cylinder and piston unit and the work moving fluid motor.

5. In a pull down broaching machine, a vertical broach operating cylinder and piston, a vertical broach handling cylinder and piston, a work fixture moving cylinder and piston, a source of liquid under pressure, a reservoir, a pair of fluid lines, a four-way valve adapted in one position to connect one of said lines to the source and the other to the reservoir and in another position to connect said one line to the reservoir and the other to the source, said one line being connected to one end of both the broaching cylinder and the broach handling cylinder, said one ends being the ends the admission of liquid to which causes an upward broach return stroke of the broaching cylinder and piston and an upward broach return stroke of the broach handling cylinder and piston, said other line being connected to the opposite ends of said broaching and broach handling cylinders, a valve for controlling operation of said work fixture moving cylinder and piston, a starting handle connected to said last mentioned valve and adapted when shifted in a direction to start the machine to shift said last mentioned valve in a direction to cause advance of the work fixture into broaching position, means actuated by completion of the movement of the work fixture into broaching position to shift said four-way valve to said other position, a valve normally blocking flow from said other line to said broaching cylinder, means actuated upon completion of the broach advancing stroke of the broach handling cylinder and piston for opening said last valve, means actuated upon completion of the broaching stroke of the broaching cylinder and piston to return the starting handle to stop position and thereby reverse the valve for controlling operation of the work fixture piston and cylinder, means operated upon completion of the return movement of the work fixture to return said four-way valve to said one position, and a valve operative to block flow of fluid from said one line to said broach handling cylinder and piston until the broaching cylinder and piston has completed its return stroke.

6. In a pull down broaching machine having an automatically operable means for shuttling a broach through a broaching and broach return cycle, a stationary work table support, a work table slidably mounted on the support, means to shift the table from a loading position to a broaching position, said table and support having openings for the passage of the broach which openings are aligned when the table is in broaching position, said table and said support being formed to define a chip discharge opening extending from one edge of the table and support to the other in the direction in which the table moves relative to the support and intersecting the openings through which the broach passes.

7. In a pull down broaching machine having an automatically operable means for shuttling a plurality of broaches simultaneously through a broaching and broach return cycle, a stationary work table support, a work table slidably mounted on the support, means to shift the table from a loading position to a broaching position, said table and support having openings for the passage of the broaches which openings are aligned when the table is in broaching position, said table and said support being formed to define a chip discharge opening extending from one edge of the table and support to the other in the direction in which the table moves relative to the support and intersecting each opening through which the broaches pass.

8. In a pull down broaching machine having an automatically operable means for shuttling a plurality of broaches simultaneously through a broaching and broach return cycle, a stationary work table support, a work table slidably mounted on said support for movement from a loading position to a broaching position, said table having a plurality of rows of openings for the passage of the broaches through the table, said rows extending in the direction of movement of the table, openings in the work table support which are aligned with the table openings when the table is in broaching position, said table and said support being formed to define a chip discharge opening for each row of table openings extending in the direction of movement of said table from one edge thereof to the other, a table moving arm located beneath the table and pivoted for movement about a vertical axis, said arm having one extremity pivotally connected to the table at a point between adjacent chip discharge openings, and means for swinging said arm in order to shift said table.

BENEDICT WELTE.